United States Patent
Deng et al.

(10) Patent No.: US 10,960,841 B2
(45) Date of Patent: Mar. 30, 2021

(54) SEAT AIRBAG

(71) Applicant: Ford Global Technologies, LLC, Dearborn, MI (US)

(72) Inventors: Zhibing Deng, Northville, MI (US); Krishnakanth E. Aekbote, Novi, MI (US); Tzu-Chen Weng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 110 days.

(21) Appl. No.: 16/380,429

(22) Filed: Apr. 10, 2019

(65) Prior Publication Data
US 2020/0324728 A1     Oct. 15, 2020

(51) Int. Cl.
| | |
|---|---|
| *B60R 21/207* | (2006.01) |
| *B60R 21/231* | (2011.01) |
| *B60R 21/2338* | (2011.01) |
| *B60R 21/239* | (2006.01) |
| *B60R 22/12* | (2006.01) |
| *B60R 21/0136* | (2006.01) |
| *B60R 21/01* | (2006.01) |

(52) U.S. Cl.
CPC ........ *B60R 21/207* (2013.01); *B60R 21/0136* (2013.01); *B60R 21/239* (2013.01); *B60R 21/2338* (2013.01); *B60R 21/23138* (2013.01); *B60R 22/12* (2013.01); *B60R 2021/01211* (2013.01); *B60R 2021/23146* (2013.01); *B60R 2021/23382* (2013.01)

(58) Field of Classification Search
CPC . B60R 21/207; B60R 21/239; B60R 21/0136; B60R 21/2338; B60R 21/23138; B60R 22/12; B60R 2021/23146; B60R 2021/23382; B60R 2021/01211
See application file for complete search history.

(56) References Cited

U.S. PATENT DOCUMENTS

| | | | |
|---|---|---|---|
| 5,636,862 A * | 6/1997 | Cheung ................. | B60R 21/207 280/730.2 |
| 7,240,915 B2 | 7/2007 | Peng et al. | |
| 8,360,469 B2 | 1/2013 | Wiik et al. | |
| 8,690,187 B2 | 4/2014 | Fukawatase | |
| 8,899,619 B2 | 12/2014 | Fukawatase | |
| 9,132,798 B2 | 9/2015 | Yasuoka | |
| 9,994,181 B1 * | 6/2018 | Dubaisi ................. | B60R 21/207 |
| 2006/0022441 A1 * | 2/2006 | Hayashi ............ | B60R 21/23138 280/730.2 |
| 2006/0119082 A1 * | 6/2006 | Peng ................... | B60R 21/2338 280/730.2 |
| 2006/0119083 A1 | 6/2006 | Peng et al. | |

(Continued)

FOREIGN PATENT DOCUMENTS

WO     2016094561 A1     6/2016

*Primary Examiner* — Darlene P Condra
(74) *Attorney, Agent, or Firm* — Frank A. MacKenzie; Bejin Bieneman PLC (57) ABSTRACT

An assembly includes a seatback and an airbag. The airbag includes an upper panel and a lower panel spaced from each other and an intermediate panel disposed therebetween. The upper panel and the lower panel are each uninflatable and each supported by the seatback. The intermediate panel is supported by the seatback and inflatable to an inflated position. The intermediate panel in the inflated position includes a valley elongated in a direction from the lower panel towards the upper panel.

18 Claims, 8 Drawing Sheets

(56) References Cited

U.S. PATENT DOCUMENTS

| | | | |
|---|---|---|---|
| 2006/0131847 A1* | 6/2006 | Sato | B60R 21/23138 |
| | | | 280/730.2 |
| 2015/0298639 A1* | 10/2015 | Mihm | B60R 21/207 |
| | | | 280/728.2 |
| 2018/0093635 A1* | 4/2018 | Mallinger | B60R 21/2338 |

* cited by examiner

SEAT AIRBAG

BACKGROUND

A side airbag is mounted to a seatback and is inflatable along a side of an occupant, specifically along the torso and/or hip of the occupant. The side airbag, for example, may be inflatable between the occupant and a center console. The side airbag controls the kinematics of the occupant in vehicle impacts that urge the occupant in a cross-vehicle direction, e.g., a side impact.

DETAILED DESCRIPTION

An assembly includes a seatback, and an airbag including an upper panel and a lower panel spaced from each other and an intermediate panel disposed therebetween. The upper panel and the lower panel each are uninflatable and each are supported by the seatback. The intermediate panel is supported by the seatback and is inflatable to an inflated position. The intermediate panel in the inflated position includes a valley elongated in a direction from the lower panel towards the upper panel.

The assembly may include a retractor disposed on the seatback. The upper panel may be retractably engaged with the retractor.

The assembly may include a processor and a memory storing instructions to actuate the retractor in response to detecting the intermediate panel in the inflated position.

The intermediate panel may include a first portion and a second portion disposed on opposite sides of the valley. The first portion and the second portion may be in fluid communication with each other.

The first portion may extend transverse to the second portion and the seatback.

The intermediate panel may include a distal end spaced from the seatback in the inflated position. The upper panel and the lower panel each may extend across the valley towards the distal end.

The distal end may be disposed outboard of the valley.

The upper panel and the lower panel each may extend from the intermediate panel to the seatback.

The valley may be spaced from at least one of the upper panel and the lower panel.

The upper panel and the lower panel may be triangular. The upper panel and the lower panel each may include a base extending along the intermediate panel and a vertex spaced from the intermediate panel and engaged with the seatback.

The seatback may include an upper end and an inboard side and an outboard side spaced each other and each extending downwardly from the upper end. The intermediate panel may be disposed on the inboard side of the seatback.

The assembly may include a seatbelt assembly having a webbing extending from the outboard side of the seatback downwardly across the seatback in an extended position. The intermediate panel may be spaced from the webbing in the extended position.

The upper panel may be engaged with the upper end and the lower panel may be engaged with the inboard side.

The intermediate panel may include an inboard side facing the outboard side of the seatback in the inflated position. The valley may be disposed on the inboard side of the intermediate panel.

The intermediate panel may define an inflation chamber. The intermediate panel may include a tether disposed in the inflation chamber and extending from the valley across the inflation chamber.

The intermediate panel may include a plurality of tethers disposed in the inflation chamber and extending from the valley across the inflation chamber. The plurality of tethers may be spaced from each other along the valley.

The tether may be elongated along the valley.

The tether may include a vent.

The assembly may include a processor and a memory storing instructions to inflate the intermediate panel in response to detecting one of a far side oblique impact and a frontal impact.

The valley may be disposed adjacent to a shoulder of an occupant between 5th-percentile female and 95th-percentile male stature sitting against the seatback.

With reference to the Figures, wherein like numerals indicate like parts throughout the several views, a vehicle 10 is generally shown. The vehicle 10 includes an assembly 12 having a seatback 14 and an airbag 16. The airbag 16 includes an upper panel 18 and a lower panel 20 spaced from each other and an intermediate panel 22 disposed therebetween. The upper panel 18 and the lower panel 20 are each uninflatable and each supported by the seatback 14. The intermediate panel 22 is supported by the seatback 14 and inflatable to an inflated position. The intermediate panel 22 in the inflated position includes a valley 24 elongated in a direction D from the lower panel 20 towards the upper panel 18.

Figure 1:
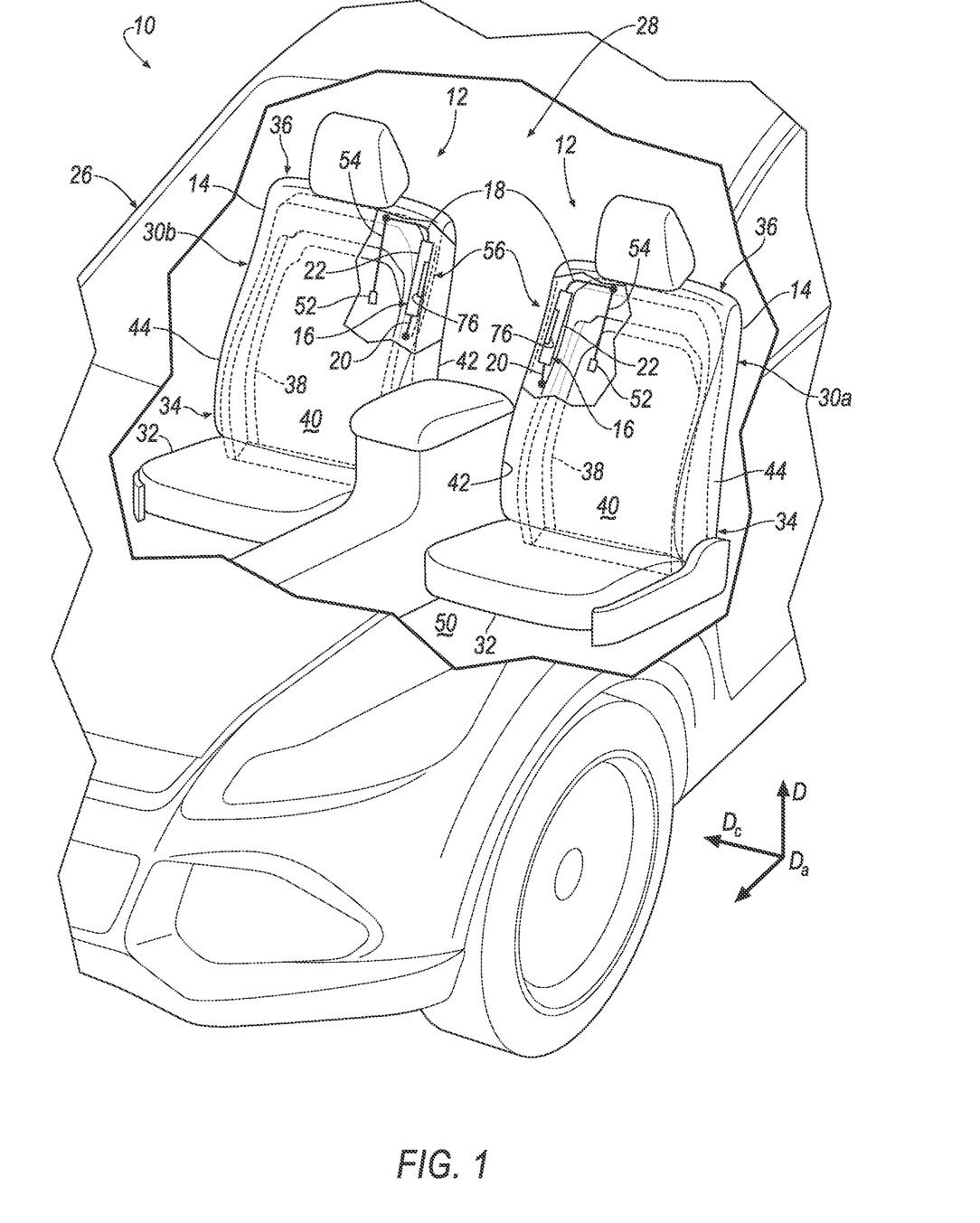
FIG. 1 is a perspective view of a vehicle including an airbag in an uninflated position.

During a vehicle impact, the airbag 16 may be deployed from an uninflated position, as shown in FIG. 1, to the inflated position, as shown in FIGS. 2A-4B. During the vehicle impact, e.g., a far side oblique impact or a frontal impact, an occupant may be forced into the airbag 16 in the inflated position. During the vehicle impact, the airbag 16 may control the kinematics of the occupant, e.g., a shoulder of an occupant. The airbag 16 may assist in retaining the occupant on the seatback 14. For example, the airbag 16 may slow or stop the occupant from moving obliquely off the seatback 14.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 may include two sides (not numbered) spaced from each other in the cross-vehicle direction Dc. The sides of the vehicle 10 may be elongated in a vehicle fore-and-aft direction Da. Each side of the vehicle 10 may be similar or identical to each other.

With reference to FIG. 1, the vehicle 10 includes a body 26 defining a passenger cabin 28. The passenger cabin 28 houses occupants, if any, of the vehicle 10. The passenger cabin 28 includes a front end (not numbered) and a rear end (not numbered) with the front end being in front of the rear end during forward movement of the vehicle 10. The passenger cabin 28 includes one or more seats 30. The seats 30 may be arranged in any suitable arrangement. For example, one or more of the seats 30 may be at the front end of the passenger cabin 28, i.e., a front seat, and/or one or more of the seats 30 may be at the rear end of the passenger cabin 28, i.e., a rear seat. Specifically, the passenger cabin 28 may include two front seats 30, i.e., a driver seat 30a and a passenger seat 30b, spaced from each other in the cross-vehicle direction Dc.

With reference to the Figures, each seat 30 may include the seatback 14, a seat bottom 32, and a head restraint (not numbered). The head restraint may be supported by the seatback 14 and may be stationary or movable relative to the seatback 14. The seatback 14 may be supported by the seat bottom 32 and may be stationary or movable relative to the seat bottom 32. The seatback 14, the seat bottom 32, and/or the head restraint may be adjustable in multiple degrees of freedom. Specifically, the seatback 14, the seat bottom 32, and/or the head restraint may themselves be adjustable, in other words, adjustable components within the seatback 14, the seat bottom 32, and/or the head restraint, and/or may be adjustable relative to each other.

As shown in the Figures, the seatback 14 may include a lower end 34 adjacent to the seat bottom 32 and an upper end 36 spaced from the lower end 34. The upper end 36 may be adjacent to the head restraint. Specifically, the upper end 36 of the seatback 14 may support the head restraint. The seatback 14 may be elongated from the lower end 34 to the upper end 36 in the direction D, i.e., transverse to the cross-vehicle direction Dc and the vehicle fore-and-aft direction Da.

Each seat 30 may include a seat frame 38, as shown in FIG. 1. The seat frame 38 may include tubes, beams, etc. The seat frame 38 may be of any suitable plastic material, e.g., carbon fiber reinforced plastic (CFRP), glass fiber-reinforced semi-finished thermoplastic composite (organosheet), etc. As another example, some or all components of the seat frame 38 may be of a suitable metal, e.g., steel, aluminum, etc.

A covering 40 may be supported on the seat frame 38. The covering 40 may include upholstery and padding. The upholstery may be formed of cloth, leather, faux leather, or any other suitable material. The upholstery may be stitched in panels around the seat frame 38. The padding may be between the covering 40 and the seat frame 38 and may be foam or any other suitable material.

With reference to FIG. 1, the seatback 14 may include an inboard side 42 and an outboard side 44 spaced from the inboard side 42 in the cross-vehicle direction Dc. The seatback 14 may terminate at the sides 42, 44. The inboard side 42 may be disposed between the outboard side 44 and a center console, i.e., the vehicle fore-and-aft direction Da.

A backrest (not numbered) may extend from the inboard side 42 to the outboard side 44. The sides 42, 44 of the seatback 14 may extend from the backrest in a direction that an occupant of the seat 30 would face, that is, in a forward direction as defined by the seat 30. The sides 42, 44 of the seatback 14 may extend along the seatback 14 in an upward direction as defined by the seat 30. For example, the sides 42, 44 of the seatback 14 may extend upwardly from the lower end 34 to the upper end 36 of the seatback 14, i.e., in the direction D. The sides 42, 44 of the seatback 14 may support an occupant laterally relative to the seat 30.

With reference to FIG. 1, the seatback 14, e.g., the covering 40, may include a tear seam (not shown). The tear seam may be disposed on one side 42, 44 of the seatback 14. As shown in FIG. 1, the tear seam may be disposed on the inboard side 42 of the seatback 14. For example, the tear seam may be disposed adjacent to the airbag 16. Specifically, the tear seam may extend along the upper end 36 and the inboard side 42 of the seatback 14. Said differently, the airbag 16 may extend through the tear seam in the inflated position. The tear seam may have any suitable shape. For example, the tear seam may have a linear shape, i.e., extending in a line along the seatback 14. Alternatively, the tear seam may have a circular shape, e.g., extending around the airbag 16.

The tear seam may be designed to tear apart when subjected to a tensile force above a threshold magnitude. In other words, the covering 40 on one side of the tear seam separates from the covering 40 on the other side of the tear seam when the force is above the threshold magnitude. The threshold magnitude may be chosen to be greater than forces from, e.g., inadvertent pushing against the seatback 14 by an occupant but be less than forces from the deployment of the airbag 16. The tear seam may be, for example, a line of perforations through the covering 40, a line of thinner covering material than the rest of the covering 40, etc.

The vehicle 10 may include a seatbelt assembly 46 adjacent to each seat 30. Specifically, the seatbelt assembly 46 may be disposed adjacent to the outboard side 44 of the seatback 14, as shown in FIG. 1. The seatbelt assembly 46 may include a seatbelt retractor (not shown) and a webbing 48 retractably payable from the seatbelt retractor. Additionally, the seatbelt assembly 46 may include an anchor (not shown) coupled to the webbing 48, and a clip (not numbered) that engages a buckle (not numbered). The seatbelt assembly 46, when fastened, retains the occupant on the seat 30, e.g., during sudden decelerations of the vehicle 10.

Figure 2A:
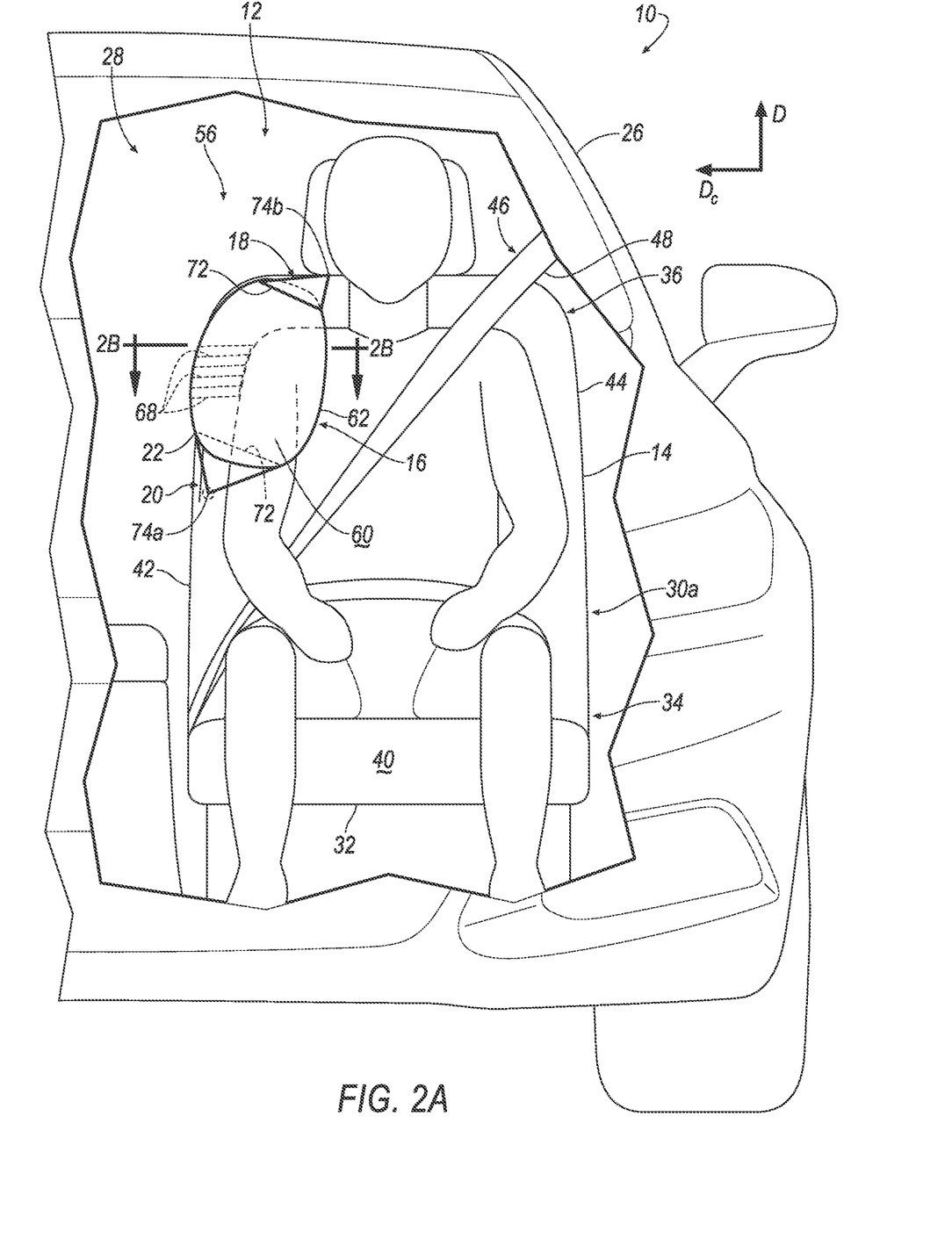
FIG. 2A is a front view of the airbag in the inflated position.
Figure 3A:
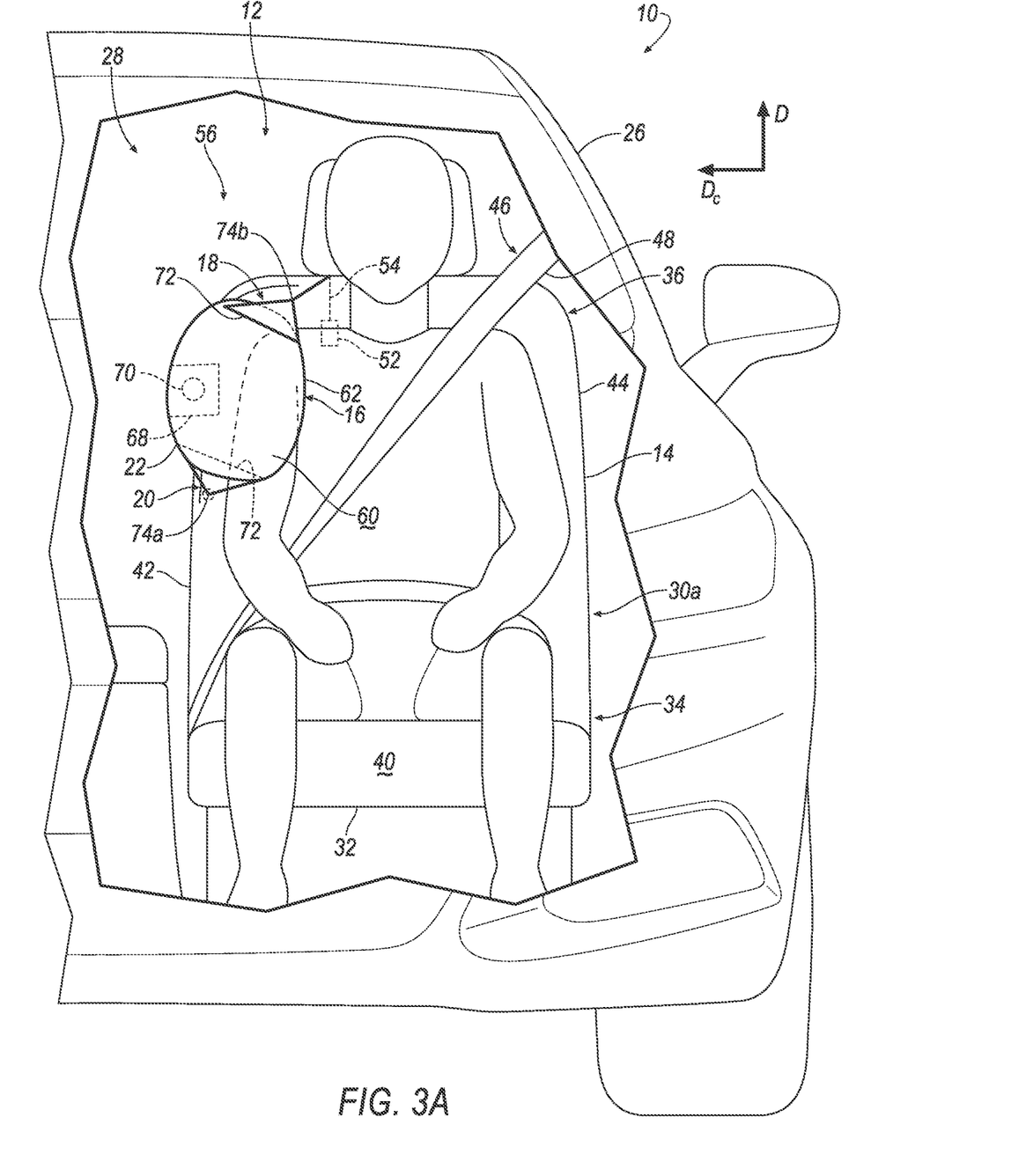
FIG. 3A is a front view of the vehicle including the airbag in an inflated position and engaged with a strap in an extended position.
Figure 4A:
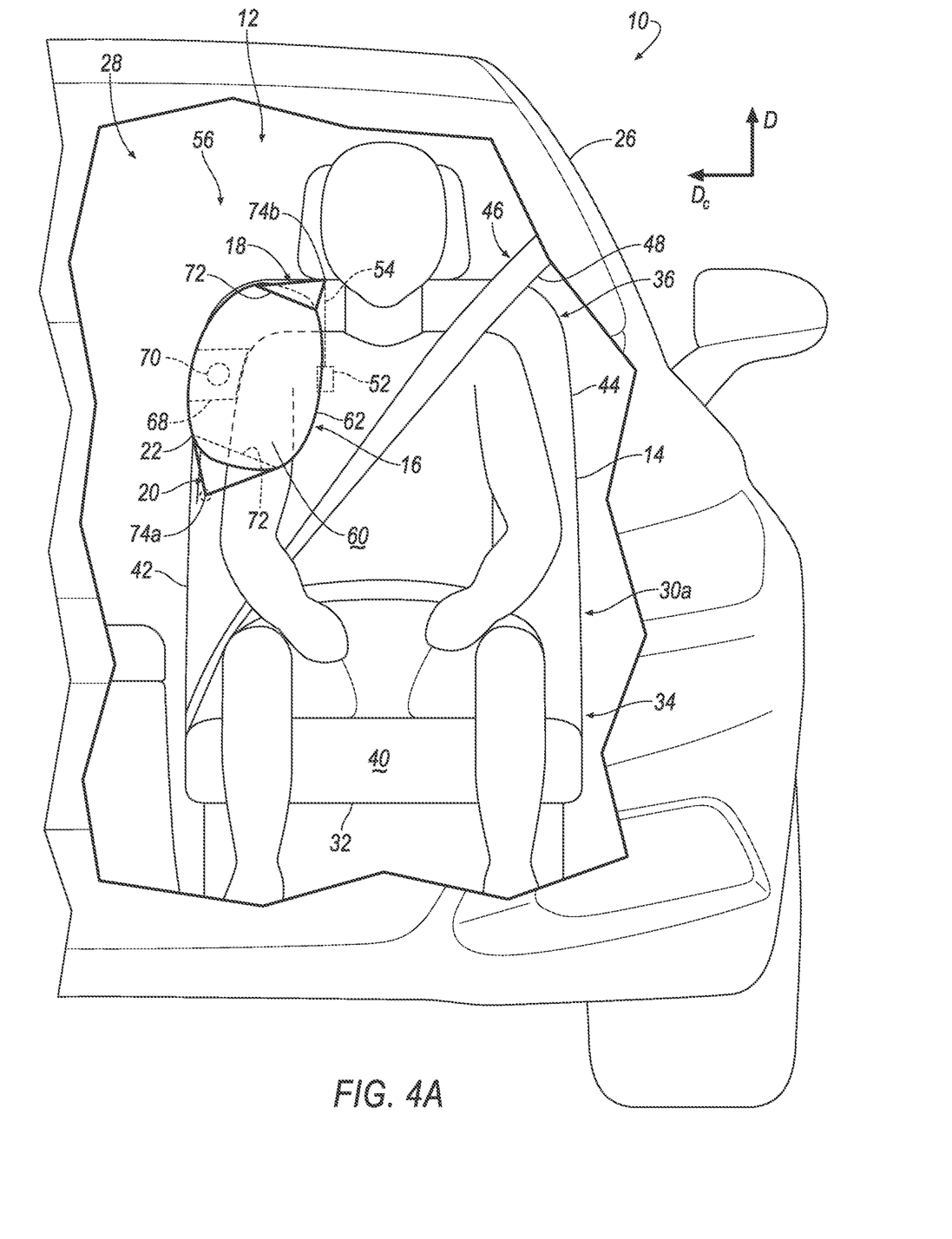
FIG. 4A is a front view of the vehicle including the airbag in the retracted position and engaged with the strap in a retracted position.

The anchor attaches one end of the webbing 48 to the seat 30. The other end of the webbing 48 feeds into the seatbelt retractor. The clip slides freely along the webbing 48 and, when engaged with the buckle, divides the webbing 48 into a lap band and a shoulder band. The webbing 48 may be retractable to a retracted position and extendable to an extended position relative to the retractor. In the retracted position, the webbing 48 may be disposed adjacent to the outboard side 44 of the seatback 14. In the extended position, the webbing 48 may be paid out from the retractor, e.g., towards the occupant, and the clip may be engaged with the buckle. In this situation, the webbing 48 may extend across the seatback 14, e.g., from the outboard side 44 to the inboard side 42. Specifically, the shoulder band may extend from the upper end 36 of the seatback 14 on the outboard side 44 of the seatback 14 to the lower end 34 of the seatback 14 on the inboard side 42 of the seatback 14, as shown in FIGS. 2A, 3A, and 4A. The shoulder band in the extended position may extend across one shoulder of an occupant seated in the seat 30. Specifically, the shoulder band of the webbing 48 may be positioned to engage one shoulder, e.g., the shoulder adjacent to the outboard side 44 of the seatback 14, of an occupant between 5th-percentile female and 95th-percentile male stature sitting against the seatback 14, i.e., in the seat 30. The $5^{th}$ percentile female and $95^{th}$ percentile male stature may be based on a standards-setting body, e.g., a government agency such as the National Highway Traffic Safety Administration (NHTSA). As one example, NHTSA has defined the $5^{th}$ percentile female stature to be 5 feet tall and 1 pounds, e.g., the Hybrid III $5^{th}$ percentile female. As another example, NHTSA has defined the $95^{th}$ percentile male stature to be 6 feet 2 inches tall and 2 pounds, e.g., the Hybrid III $95^{th}$ percentile male.

The seatbelt assembly 46 may be a three-point harness, as shown in FIG. 1, meaning that the webbing 48 is attached at three points around the occupant when fastened: the anchor, the seatbelt retractor, and the buckle. The seatbelt assembly 46 may, alternatively, include another arrangement of attachment points.

With continued reference to FIG. 1, the body 26 includes a floor 50. The floor 50 may define the lower boundary of the passenger cabin 28 and may extend from the front end of the passenger cabin 28 to the rear end of the passenger cabin 28. Additionally, the floor 50 may extend from one side of the vehicle 10 to another side of the vehicle 10.

Each seat 30 is supported by the floor 50, as shown in FIG. 1. The position and orientation of the seats 30 and components thereof may be adjustable by an occupant. In this situation, each seat 30 may slide relative to the floor 50, e.g., in the vehicle fore-and-aft direction Da, along a seat track (not shown). As another example, each seat 30 may be fixed relative to the floor 50. In this situation, the seats 30 may be immovable relative to the floor 50.

The assembly 12 may include an airbag assembly 56, which includes the airbag 16. The seatback 14 may support the airbag assembly 56, and specifically, may support the airbag 16 when the airbag 16 is in the inflated position. For example, the inboard side 42 of the seatback 14 may support the airbag assembly 56, as shown in the Figures. The airbag assembly 56 may be mounted to the seatback 14, as set forth below.

The airbag assembly 56 may include a base (not shown) attached to the seatback 14 and supporting the airbag 16. The base may be flat. As another example, the base may include a cavity that may house the airbag 16 in the uninflated position and may support the airbag 16 on the seatback 14 in the inflated position. The base may, for example, include clips, fasteners, panels, etc. for attaching the airbag 16 and for attaching the airbag assembly 56 to the seat 30. In the alternative to the base, the airbag 16 may be directly mounted to the seatback 14, for example, with clips, fasteners, etc.

The vehicle 10 may include any suitable number of airbag assemblies 56. For example, the vehicle 10 may include two airbag assemblies 56. In such an example, the airbag assemblies 56 each may be supported by one respective front seat 30, as shown in FIG. 1. In other words, one airbag assembly 56 may be supported by the driver seat 30a, and another airbag assembly 56 may be supported by the passenger seat 30b.

The airbag 16 may be supported by the seatback 14 of one seat 30. For example, the airbag 16 may be supported by the inboard side 42 of the seatback 14, as shown in FIG. 1. The airbag assembly 56 may be fixed to the seat frame 38. The airbag 16 may, for example, be disposed in the seatback 14 in the uninflated position, e.g., between the covering 40 and the seat frame 38. In other words, the covering 40 may cover the airbag 16 in the uninflated position. In the inflated position, the airbag 16 may extend through the inboard side 42 of the seatback 14, i.e., the tear seam disposed on the inboard side 42 of the seatback 14. In this situation, the airbag 16 may extend outwardly from the inboard side 42 of the seatback 14.

The airbag 16 may be spaced from the seatbelt assembly 46, e.g., the webbing 48, as shown in the Figures. For example, the webbing 48 and the airbag 16 may be disposed adjacent to opposite shoulders of the occupant. In other words, the seatbelt assembly 46 may be engageable with one shoulder of the occupant, e.g., adjacent to the outboard side 44 of the seatback 14, and the airbag 16 may be engageable with the other shoulder of the occupant, e.g., adjacent to the inboard side 42 of the seatback 14.

The intermediate panel 22 may be formed of any suitable type of material, e.g., from a woven polymer. For example, the intermediate may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The intermediate panel 22 may be a single continuous unit, e.g., a single piece of fabric. Alternatively, the intermediate panel 22 may include a plurality of segments, i.e., two or more. The segments may be attached to each other in any suitable fashion, e.g., a plurality of panels attached by stitching, ultrasonic welding, etc.

Figure 2B:
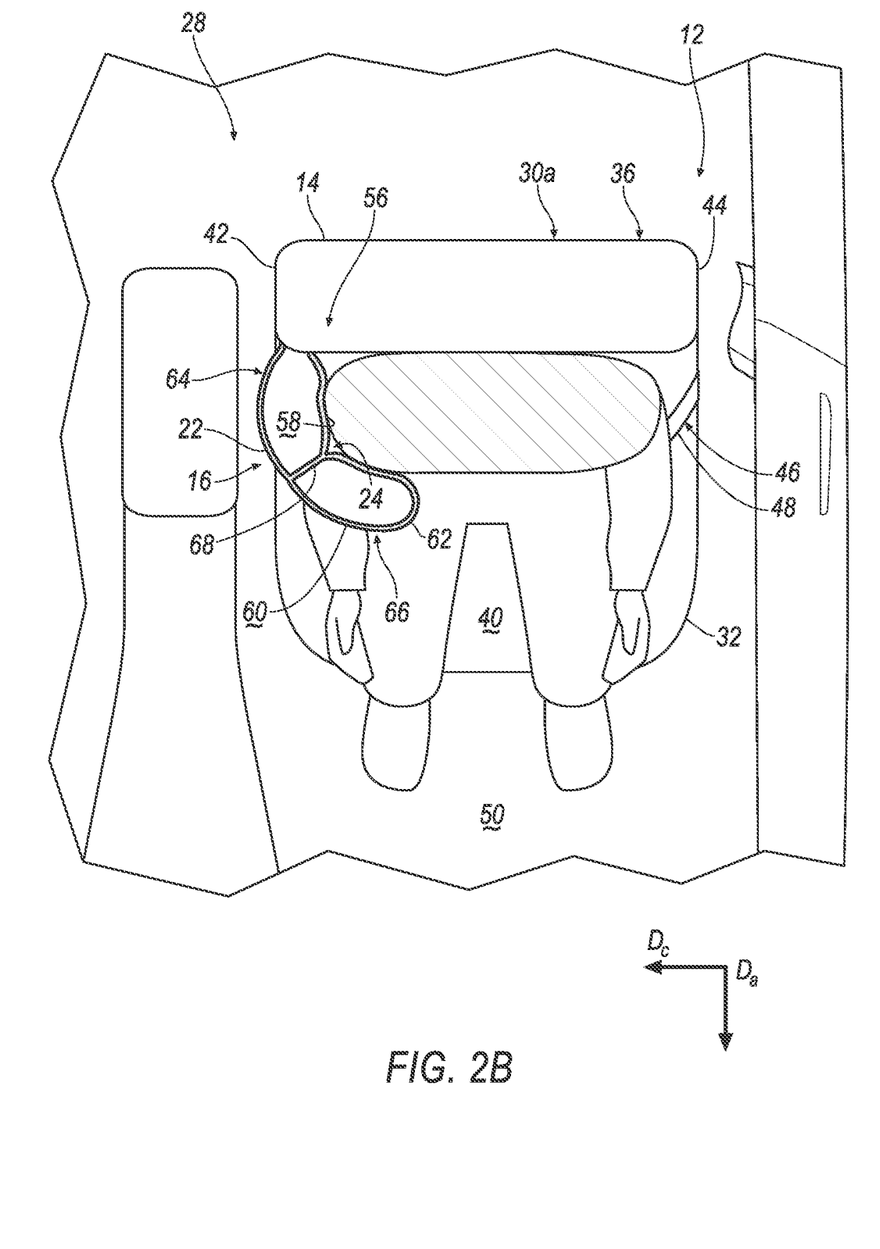
FIG. 2B is a cross-sectional view along line 2B in FIG. 2A of the airbag in the inflated position.
Figure 3B:
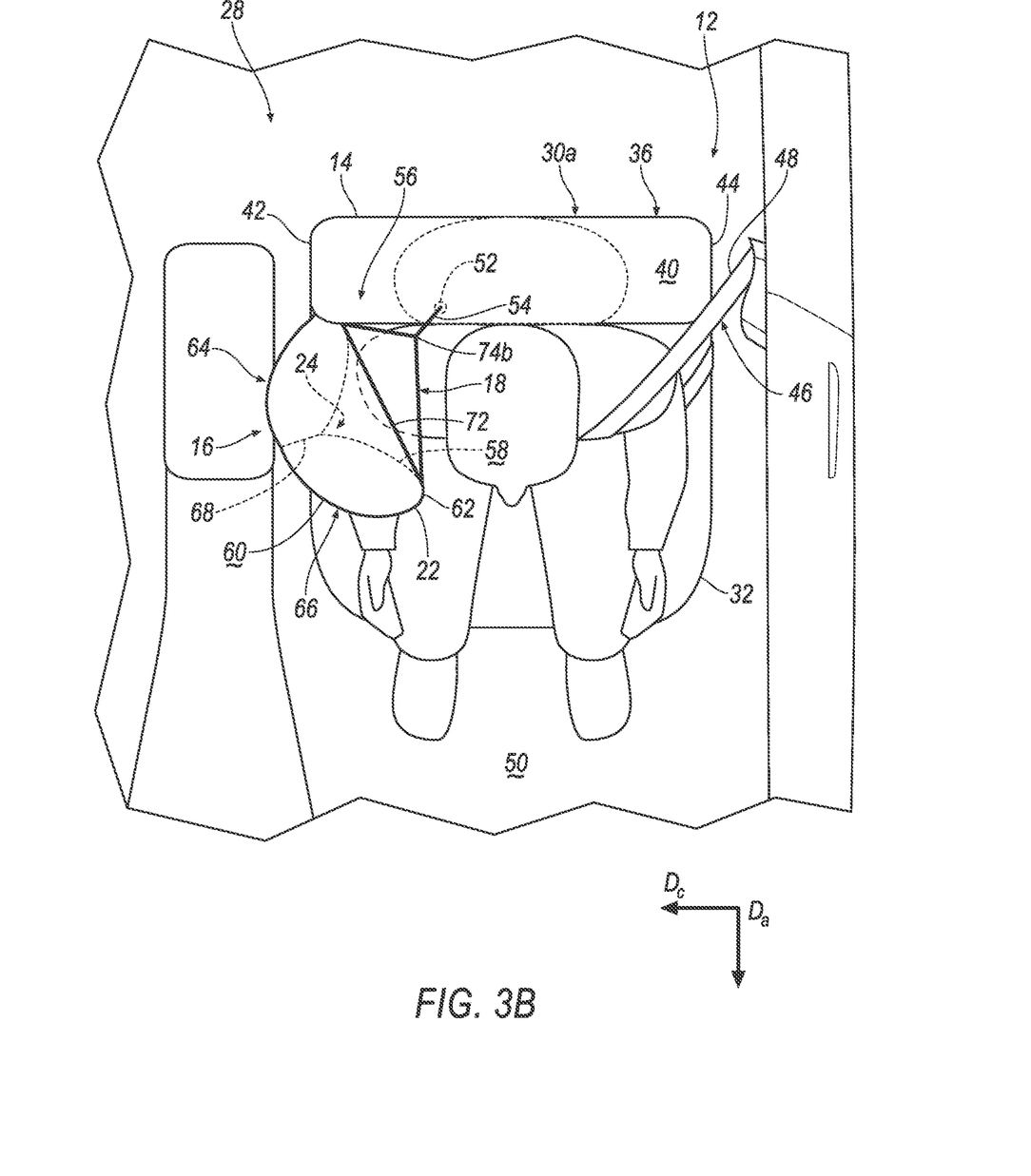
FIG. 3B is a top view of the vehicle including the airbag in the inflated position and engaged with the strap in the extended position.
Figure 4B:
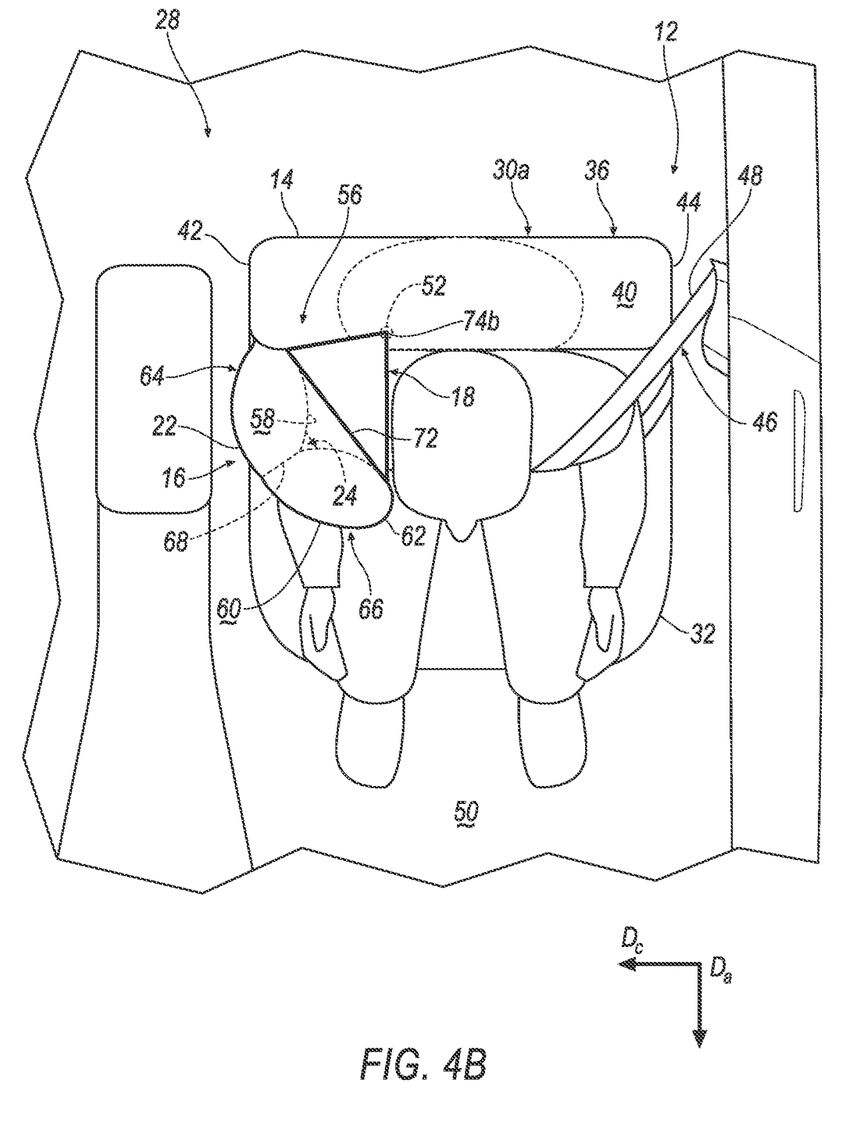
FIG. 4B is a top view of the vehicle including the airbag in the retracted position and engaged with the strap in the retracted position.

With reference to FIGS. 2B, 3B, and 4B, the intermediate panel 22 may include a distal end 62 spaced from the seatback 14 in the inflated position. The distal end 62 may be disposed outboard of the valley 24 in the inflated position. In other words, the distal end 62 may be disposed between the valley 24 and the outboard side 44 of the seatback 14 in the inflated position. The intermediate panel 22 terminates at the distal end 62.

With continued reference to FIGS. 2B, 3B, and 4B, the intermediate panel 22 may include a first portion 64 and a second portion 66 disposed on opposite sides of the valley 24. The first portion 64 may be elongated from the seatback 14 to the valley 24, and the second portion 66 may be elongated from the valley 24 to the distal end 62. The first portion 64 may, for example, be disposed inboard of the occupant, and the second portion 66 may be disposed in front of the occupant. In other words, the second portion 66 may be spaced from the seatback 14. In such an example, the airbag 16 may bend towards the outboard side 44 of the seatback 14 at the valley 24. For example, the first portion 64 may extend generally in the vehicle-fore-and-aft direction Da. In this situation, the first portion 64 may be elongated along the shoulder of the occupant, i.e., towards the front of the passenger cabin 28. Additionally, the second portion 66 may be elongated generally in the cross-vehicle direction Dc. In other words, the second portion 66 may be elongated across the shoulder of the occupant, i.e., towards the outboard side 44 of the seatback 14.

With continued reference to FIGS. 2B, 3B, and 4B, the intermediate panel 22 may include an inboard surface 58 and an outboard surface 60 facing away from the inboard surface 58. The inboard surface 58 may, for example, face the occupant in the inflated position, and the outboard surface 60 may face away from the occupant in the inflated position.

The intermediate panel 22 may define an inflation chamber (not numbered). Specifically, the inboard surface 58 and the outboard surface 60 of the intermediate panel 22 may define the inflation chamber. The inflation chamber may be inflatable from the uninflated position to the inflated position. The inflation chamber may extend through the first portion 64 and the second portion 66 of the intermediate panel 22. In other words, the first portion 64 and the second portion 66 of the intermediate panel 22 may be in fluid communication with each other.

With reference to FIGS. 2B, 3B, and 4B, the valley 24 may be disposed on the inboard surface 58 of the intermediate panel 22. In other words, the valley 24 may face the occupant of the seat 30. Specifically, the valley 24 may disposed adjacent to a shoulder of an occupant between 5th-percentile female and 95th-percentile male stature sitting in the seat 30. Said differently, the valley 24 may be positioned to receive and be impacted by the shoulder of the occupant seated in the seat 30, e.g., adjacent to the inboard side 42 of the seatback 14, when the intermediate panel 22 is inflated during an impact that urges the occupant towards the intermediate panel 22.

The valley 24 may extend any suitable amount in the direction D. For example, the valley 24 may be spaced from at least one of the upper panel 18 and the lower panel 20. In this situation, the valley 24 may be spaced from both the upper panel 18 and the lower panel 20, as shown in FIGS. 2A, 3A, and 4A. Alternatively, the valley 24 may be spaced from one of the upper panel 18 and the lower panel 20. In other words, the valley 24 may, for example, extend from one panel 18, 20 towards the other panel 18, 20. As another example, the valley 24 may extend from the lower panel 20 to the upper panel 18.

The valley 24 may have any suitable shape. For example, the sides of the valley 24 may be curved, i.e., arced, away from each other. As another example, the sides of the valley 24 may be straight, i.e., moving uniformly in one direction, towards each other. As yet another example, the sides of the valley 24 may be curved, i.e., arced, towards each other. Said differently, the valley 24 may have a curved V-shape, a U-shape, or any other suitable shape.

The intermediate panel 22 may include a tether 68 disposed in the inflation chamber. The tether 68 may extend across the inflation chamber from the valley 24 to the outboard surface 60 of the intermediate panel 22, as shown in FIGS. 2A-4B. In other words, the tether 68 may be disposed between the first portion 64 and the second portion 66. The tether 68 may be fixed to the valley 24 and the outboard surface 60 of the intermediate panel 22. The tether 68 may be fixed to the valley 24 and the outboard surface 60 in any suitable manner, e.g., stitching, ultrasonic welding, etc. The tether 68 may be any suitable material, e.g., fabric, woven polymer, etc.

The intermediate panel 22 may include any suitable number of tethers 68. For example, the intermediate panel 22 may include one tether 68, as shown in FIGS. 3A-4B. In such an example, the tether 68 may extend entirely along the valley 24. Additionally, the tether 68 may include at least one vent 70 extending through the tether 68. The vent 70 allows fluid communication from one side to the other side of the tether 68. In other words, the vent 70 allows fluid communication between the first portion 64 and the second portion 66. As another example, the intermediate panel 22 may include a plurality of tethers 68 spaced from each other along the valley 24, i.e., in the direction, as shown in FIG. 2A. The vent 70 may be any suitable type of vent, i.e., an active vent, a passive vent, etc.

The upper panel 18 and the lower panel 20 maintain the position and orientation of the intermediate panel 22 in the inflated position. The upper panel 18 and the lower panel 20 are each uninflatable, as set forth above. In other words, neither the upper panel 18 nor the lower panel 20 may define an inflation chamber, e.g., the upper panel 18 and the lower panel 20 each may be a panel of material that is not fixed to another panel, or itself, to enclose a volume for receiving inflation medium. The upper panel 18 and the lower panel 20 each may be woven fabric, or any other suitable material. For example, the upper panel 18, the lower panel 20, and the intermediate panel 22 may be a same type of material.

The upper panel 18 and the lower panel 20 may each extend from the intermediate panel 22 to the seatback 14, as shown in FIGS. 2A-4B. The upper panel 18 and the lower panel 20 each may be fixed to the intermediate panel 22. The upper panel 18 and the lower panel 20 may be fixed to the intermediate panel 22, e.g., by stitching, ultrasonic welding, etc.

The upper panel 18 and the lower panel 20 may have any suitable shape. The upper panel 18 and the lower panel 20 may have a same or different shape. For example, the upper panel 18 and the lower panel 20 may each be triangular, as shown in FIGS. 2A-4B. In such an example, the upper panel 18 and the lower panel 20 may each include a base 72 fixed to the intermediate panel 22 and a vertex 74 spaced from the intermediate panel 22. The base 72 of each panel 18, 20 may extend along the intermediate panel 22, e.g., towards the distal end 62. In other words, the base 72 of each panel 18, 20 may extend along the first portion 64 and the second portion 66 of the intermediate panel 22. Said differently, the upper panel 18 and the lower panel 20 may each extend across the valley 24.

With reference to FIGS. 2A, 3A, and 4A, the vertex 74a of the lower panel 20 may be fixed to the seatback 14. Specifically, the vertex 74a of the lower panel 20 may be fixed to the inboard side 42 of the seatback 14. For example, the vertex 74a of the lower panel 20 may be fixed to the seat frame 38. In other words, the vertex 74a of the lower panel 20 may be disposed between the upper end 36 and the lower end 34 of the seatback 14. The vertex 74a of the lower panel 20 may be fixed at any suitable position on the inboard side 42 of the seatback 14. For example, the vertex 74a of the lower panel 20 may be fixed to the inboard side 42 of the seatback 14 adjacent to an elbow of an occupant between 5th-percentile female and 95th-percentile male stature sitting in the seat 30.

The vertex 74b of the upper panel 18 may be engaged with the upper end 36 of the seatback 14. In one example, as shown in FIG. 2A, the vertex 74b of the upper panel 18 may be fixed to the upper end 36 of the seatback 14. For example, the vertex 74b of the upper panel 18 may be fixed to the seat frame 38.

In another example, the assembly 12 may include a retractor 52 and a strap 54 retractably engaged with the retractor 52, as shown in FIGS. 3A-4B. The retractor 52 may be disposed on the seatback 14. For example, the retractor 52 may be attached to the seatback 14. Specifically, the retractor 52 may be mounted to the seat frame 38, e.g., by fasteners, welding, etc. In this situation, the retractor 52 may be covered by the covering 40 of the seat 30. The retractor 52 may be disposed adjacent to the upper end 36 of the seatback 14. Additionally, the retractor 52 may be disposed adjacent to the inboard side 42 of the seatback 14. For example, the retractor 52 may be disposed closer to the inboard side 42 of the seatback 14 than the outboard side 44 of the seatback 14. In other words, the retractor 52 may be disposed adjacent to the shoulder of the occupant adjacent to the inboard side 42 of the seatback 14.

The strap 54 may include a first end (not shown) retractably engaged with the retractor 52 and a second end (not numbered) spaced from the retractor 52. The strap 54 is coupled to the retractor 52. The strap 54 may extend through the covering 40 of the seat 30. For example, the covering 40 may include a slot (not shown) disposed adjacent to the retractor 52, and the strap 54 may extend through and be moveable relative to the slot.

The strap 54 may be retractable from an extended position to a retracted position relative to the retractor 52. For example, the retractor 52 may generate tension on the strap 54 to pull the strap 54 from the extended position to the retracted position. The retractor 52 may include an actuator (not shown). The actuator may be any suitable type of actuator, e.g., pyrotechnic, mechanical, hydraulic, pneumatic, etc. The actuator may, for example, be a rotational actuator. In this situation, the actuator may be rotationally engaged with the strap 54 such that the strap 54 is wrapped around the actuator during retraction. Alternatively, the actuator may be a linear actuator. In this situation, the actuator may pull the strap 54 linearly during retraction. In the extended position, the strap 54 may be paid out from the retractor 52, e.g., towards the occupant. In the retracted position, the strap 54 may be retracted into the retractor 52, i.e., pulled by the actuator.

In this situation, the vertex 74*b* of the upper panel 18 may be fixed to the second end of the strap 54, as shown in FIGS. 3A-4B. In other words, the upper panel 18 may be engaged with the retractor 52, i.e., retractable relative to the seatback 14. In this situation, the strap 54 may pull the upper panel 18 towards the seatback 14 when the strap 54 is retracted to the retracted position. The vertex 74*b* of the upper panel 18 may be disposed closer to the seatback 14 in the retracted position, as shown in FIGS. 4A and 4B, as compared to the extended position, as shown in FIGS. 3A and 3B. During retraction of the strap 54 from the extended position to the retracted position, the airbag 16 may pivot about the vertex 74*a* of the lower panel 20. In other words, the airbag 16 may move towards the occupant when the strap 54 retracts the vertex 74*b* of the upper panel 18 from the extended position to the retracted position. Said differently, the airbag 16, i.e., the valley 24, may be disposed closer to the occupant when the upper panel 18 is in the retracted position as compared to the extended position.

Each panel 18, 20 is in tension between the seatback 14 and the intermediate panel 22. In this situation, the upper panel 18 may pull the intermediate panel 22 outboard, and the lower panel 20 may pull the intermediate panel 22 downward. In such an example, the intermediate panel 22 may curve towards the outboard side 44 of the seatback 14, i.e., be concave relative to the seatback 14 in the direction D. Specifically, the intermediate panel 22 may curve above the shoulder of the occupant adjacent the inboard side 42 of the seatback 14. Additionally, each panel 18, 20 may pull the second portion 66 towards the seatback 14. In such an example, the intermediate panel 22 may bend at the valley 24 towards the seatback 14. In other words, the intermediate panel 22 may be concave relative to the seatback 14 in the vehicle fore-and-aft direction Da.

When the upper panel 18 is engaged with the retractor 52, the upper panel 18 may be under more tension when the strap 54 is in the retracted position as compared to when the strap 54 is in the extended position. In this situation, the valley 24 may be elongated farther in the direction D when the strap 54 is in the retracted position as compared to the extended position. Additionally, the intermediate panel 22 may curve more, i.e., have a smaller radius, when the strap 54 is in the retracted position as compared to the extended position. Said differently, the intermediate panel 22 may bend more under increased tension from the upper panel 18. In other words, the intermediate panel 22, e.g., the second portion 66, may be closer to the occupant in the retracted position as compared to the extended position. For example, the intermediate panel 22, i.e., the valley 24, may abut the shoulder of the occupant in the retracted position, as shown in FIG. 4A, and be spaced from the shoulder of the occupant in the extended position, as shown in FIG. 3A.

The airbag assembly 56 may include an inflator 76 in fluid communication with the airbag 16 that inflates the airbag 16 from the uninflated position to the inflated position. The inflator 76 expands the airbag 16 with inflation medium, such as a gas, to move the airbag 16 from the uninflated position to the inflated position. The inflator 76 may be supported by any suitable component, e.g., the seatback 14, the base, etc.

The inflator 76 may be, for example, a pyrotechnic inflator that uses a chemical reaction to drive the inflation medium into the airbag 16. Alternatively, the inflator 76 may be, for example, a cold-gas inflator that, when activated, ignites a pyrotechnic charge that creates an opening for releasing the pressurized inflation medium to the airbag 16 via a fill tube (not shown). Alternatively, the inflator 76 may be of any suitable type, for example, a hybrid inflator.

Figure 5:
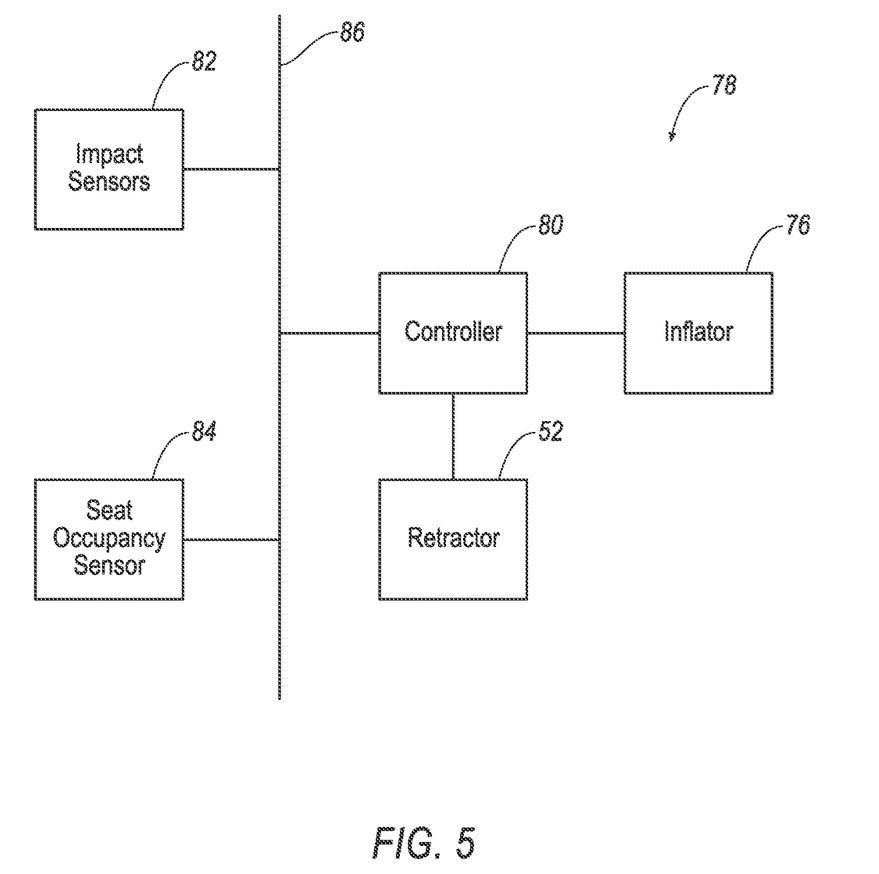
FIG. 5 is a block diagram of an inflation system of the vehicle.

With reference to FIG. 5, the vehicle may include a control system 78. The control system 78 may include the retractor 52, a controller 80, an impact sensor 82, an occupancy sensor 84, and the airbag assembly 56, e.g., the inflator 76, in communication through a communication network 86.

The impact sensor 82 may be in communication with the controller 80. The impact sensor 82 is programmed to detect an impact to the vehicle 10. The impact sensor 82 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 82 may be located at numerous points in or on the vehicle 10.

The control system 78 includes the occupancy sensor 84 for the seat 30. The occupancy sensor 84 may be configured to detect occupancy of the seat 30. The occupancy sensor 84 may be visible-light or infrared cameras directed at the seat 30, weight sensors inside the seat 30, sensors detecting whether a seatbelt (not shown) for the seat 30 is buckled or unspooled, or other suitable sensors. The occupancy sensor 84 is in communication with the controller 80 via the communications network.

The controller 80 may be a microprocessor-based controller. The controller 80 may include a processor, memory, etc. The memory of the controller 80 may store instructions executable by the processor.

The control system 78 may transmit signals through a communications network such as a controller area network (CAN) bus, Ethernet, Local Interconnect Network (LIN), and/or by any other wired or wireless communications network.

The controller 80 may be programmed to initiate an inflation of each airbag 16, e.g., the intermediate panel 22, in response to the vehicle impact. For example, in response to receiving the signals from the impact sensors 82, the controller 80 may initiate the inflation of the airbag 16, e.g., the intermediate panel 22. Specifically, the controller 80 may be programmed to initiate the inflation of each airbag 16, e.g., the intermediate panel 22, in response to one of a far side oblique impact and a frontal impact. During a frontal impact, the controller 80 may be programmed to initiate the inflation of the airbag 16 of the driver seat 30a and the airbag 16 of the passenger seat 30b. In other words, the controller 80 may be programmed to initiate inflation of each airbag 16 during a frontal impact. During a far side oblique impact, the controller 80 may be programmed to initiate the inflation of the airbag 16 of the front seat 30 spaced from the oblique impact, i.e., initiate the inflation of one airbag 16. In other words, the controller 80 may be programmed to selectively initiate the inflation of the airbag 16 based on the seat 30 and the position of the oblique impact. Said differently, when the oblique impact is on the side of the vehicle 10 adjacent to the passenger seat 30b, the controller 80 may be programmed to initiate the inflation of the airbag 16 of the driver seat 30a, and when the oblique impact is on the side of the vehicle 10 adjacent to the driver seat 30a, the controller 80 may be programmed to initiate the inflation of the airbag 16 of the passenger seat 30b.

The controller 80 may be programmed to initiate the inflation of each airbag 16, e.g., the intermediate panel 22, in response to the respective seat 30 being occupied. Specifically, the controller 80 may be programmed to receive a notification that the seat 30 is occupied and instruct the respective inflator to inflate the respective airbag 16, e.g., the intermediate panel 22, in response to the far side oblique impact or the frontal impact if the occupancy sensor 84 detects that the seat 30 is occupied.

The controller 80 may be programmed to instruct the retractor 52 to actuate in response to a detecting the airbag 16, e.g., the intermediate panel 22, is in the inflated position. In other words, the controller 80 may be programmed to actuate the retractor 52 after the airbag 16 is inflated to the inflated position. The controller 80 may detect the airbag 16 is in the inflated position in any suitable manner. For example, the controller 80 may detect the airbag 16 is in the inflated position based on the expiration of a time. In such an example, the controller 80 may start a timer when inflation of each airbag 16, e.g., the intermediate panel 22, is initiated. After a predetermined time has expired, the controller 80 may determine the airbag 16, e.g., the intermediate panel 22, is in the inflated position. Alternatively, the controller 80 may detect the airbag 16 is in the inflated position in any other suitable manner. In other words, the strap 54 may be in the extended position when the controller 80 initiates the inflation of the airbag 16. After detecting the airbag 16 is in the inflated position, the controller 80 may be programmed to actuate the retractor 52. In this situation, the retractor 52 may retract the strap 54 from the extended position to the retracted position.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 16 is in the uninflated position, under normal operating conditions of the vehicle 10. In the event of a vehicle impact, the impact sensors 82 detect the impact. The impact sensors 82 transmit a signal indicating the vehicle impact collision through the communication network 86 to the controller 80. When the vehicle impact is detected, the controller 80 transmits a signal through the communication network 86 triggering the inflator 76 to inflate the airbag 16 with inflation medium from the uninflated position to the inflated position. When the inflator 76 inflates the airbag 16 to the inflated position, the inflation medium flows into the inflation chamber, increasing the pressure in the inflation chamber. As the pressure is increased in the inflation chamber, the airbag 16 breaks through the tear seam of the seatback 14. As the occupant moves relative to the seat 30 due to momentum of the vehicle impact, the occupant moves toward the intermediate panel 22. When the occupant impacts the intermediate panel 22, the shoulder of the occupant may impact the valley 24, such that the airbag 16 absorbs energy from the occupant. In other words, the airbag 16 may absorb energy from the occupant, which may assist in retaining the occupant on the seat 30.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. An assembly comprising:
a seatback;
an airbag including an upper panel and a lower panel spaced from each other and an intermediate panel disposed therebetween, the upper panel and the lower panel each uninflatable and each supported by the seatback; and the intermediate panel supported by the seatback and inflatable to an inflated position, the intermediate panel in the inflated position including a valley elongated in a direction from the lower panel towards the upper panel;

wherein the intermediate panel defines an inflation chamber, the intermediate panel including a plurality of tethers disposed in the inflation chamber and extending from the valley across the inflation chamber, the plurality of tethers being spaced from each other along the valley.

2. The assembly of claim 1, further comprising a retractor disposed on the seatback, the upper panel is retractably engaged with the retractor.

3. The assembly of claim 2, further comprising a processor and a memory storing instructions to actuate the retractor in response to detecting the intermediate panel in the inflated position.

4. The assembly of claim 1, wherein the intermediate panel includes a first portion and a second portion disposed on opposite sides of the valley, the first portion and the second portion in fluid communication with each other.

5. The assembly of claim 4, wherein the first portion extends transverse to the second portion and the seatback.

6. The assembly of claim 1, wherein the intermediate panel includes a distal end spaced from the seatback in the inflated position, the upper panel and the lower panel each extending across the valley towards the distal end.

7. The assembly of claim 6, wherein the distal end is disposed outboard of the valley.

8. The assembly of claim 1, wherein the upper panel and the lower panel each extend from the intermediate panel to the seatback.

9. The assembly of claim 8, wherein the valley is spaced from at least one of the upper panel and the lower panel.

10. The assembly of claim 1, wherein the upper panel and the lower panel are triangular, the upper panel and the lower panel each include a base extending along the intermediate panel and a vertex spaced from the intermediate panel and engaged with the seatback.

11. The assembly of claim 1, wherein the seatback includes an upper end and an inboard side and an outboard side spaced from each other and each extending downwardly from the upper end, the intermediate panel is disposed on the inboard side of the seatback.

12. The assembly of claim 11, further comprising a seatbelt assembly having a webbing extending from the outboard side of the seatback downwardly across the seatback in an extended position, the intermediate panel spaced from the webbing in the extended position.

13. The assembly of claim 11, wherein the upper panel is engaged with the upper end and the lower panel is engaged with the inboard side.

14. The assembly of claim 11, wherein the intermediate panel includes an inboard side facing the outboard side of the seatback in the inflated position, the valley is disposed on the inboard side of the intermediate panel.

15. The assembly of claim 1, further comprising a processor and a memory storing instructions to inflate the intermediate panel in response to detecting one of a far side oblique impact and a frontal impact.

16. The assembly of claim 1, wherein the valley is configured to be disposed adjacent to a shoulder of an occupant between 5th-percentile female and 95th-percentile male stature sitting against the seatback.

17. An assembly comprising:

a seatback;

an airbag including an upper panel and a lower panel spaced from each other and an intermediate panel disposed therebetween, the upper panel and the lower panel each uninflatable and each supported by the seatback;

the intermediate panel supported by the seatback and inflatable to an inflated position, the intermediate panel in the inflated position including a valley elongated in a direction from the lower panel towards the upper panel; and a retractor disposed on the seatback, the upper panel is retractably engaged with the retractor.

18. An assembly comprising:

a seatback;

an airbag including an upper panel and a lower panel spaced from each other and an intermediate panel disposed therebetween, the upper panel and the lower panel each uninflatable and each supported by the seatback; and the intermediate panel supported by the seatback and inflatable to an inflated position, the intermediate panel in the inflated position including a valley elongated in a direction from the lower panel towards the upper panel;

wherein the upper panel extends above an upper edge of the intermediate panel and the lower panel extends below the intermediate panel.

* * * * *